(12) United States Patent
Labouche et al.

(10) Patent No.: US 11,739,222 B2
(45) Date of Patent: Aug. 29, 2023

(54) CHROMATE FREE PRETREATMENT PRIMER

(71) Applicant: PRC-DeSoto International, Inc., Sylmar, CA (US)

(72) Inventors: Didier Labouche, Saint Amand les Eaux (FR); Marie-Noelle Maillet, Le Havre (FR); Siamanto Abrami, Glendale, CA (US)

(73) Assignee: PRC-DESOTO INTERNATIONAL, INC., Slymar, CA (US)

( * ) Notice: Subject to any disclaimer, the term of this patent is extended or adjusted under 35 U.S.C. 154(b) by 479 days.

(21) Appl. No.: 16/835,107

(22) Filed: Mar. 30, 2020

(65) Prior Publication Data
US 2020/0224038 A1 Jul. 16, 2020

Related U.S. Application Data

(63) Continuation of application No. 14/273,567, filed on May 9, 2014, now abandoned.

(51) Int. Cl.
| | |
|---|---|
| *C09D 5/00* | (2006.01) |
| *C08K 3/22* | (2006.01) |
| *C09D 5/08* | (2006.01) |
| *C08G 59/50* | (2006.01) |
| *C09D 163/00* | (2006.01) |
| *C08G 59/40* | (2006.01) |
| *C09D 7/40* | (2018.01) |
| *C09D 7/61* | (2018.01) |

(52) U.S. Cl.
CPC ......... *C09D 5/002* (2013.01); *C08G 59/4085* (2013.01); *C08G 59/50* (2013.01); *C08K 3/22* (2013.01); *C09D 5/08* (2013.01); *C09D 5/082* (2013.01); *C09D 5/084* (2013.01); *C09D 7/40* (2018.01); *C09D 7/61* (2018.01); *C09D 163/00* (2013.01); *C08G 2150/90* (2013.01); *C08K 2003/222* (2013.01); *C08K 2201/019* (2013.01); *Y10T 428/31529* (2015.04)

(58) Field of Classification Search
CPC ...... C09D 163/00–10; C08L 63/00–10; C08K 5/544; C08K 2003/222; C08G 59/4085; C08G 59/504
See application file for complete search history.

(56) References Cited

U.S. PATENT DOCUMENTS 4,352,899 A * 10/1982 Tada .................... B23K 35/226
523/451

* cited by examiner

*Primary Examiner* — Kregg T Brooks
(74) *Attorney, Agent, or Firm* — Charles M. Yeomans

(57) ABSTRACT

A coating comprising epoxy functional resin, corrosion resistant particles, and a multi-functional crosslinker are disclosed as are methods of using such a coating to coat at least a portion of a substrate and a substrate coated thereby.

18 Claims, No Drawings

CHROMATE FREE PRETREATMENT PRIMER

CROSS-REFERENCE TO RELATED APPLICATIONS

This application is a continuation of U.S. patent application Ser. No. 14/273,567, filed on May 9, 2014, which is incorporated herein by reference.

FIELD OF THE INVENTION

The present invention relates to coating compositions that comprise an epoxy functional resin, a corrosion resisting particle and a crosslinker having a first functionality that will crosslink with the epoxy functionality and a second functionality that self-crosslinks. The present invention also relates to substrates at least partially coated with a coating deposited from such a composition, and multi-component composite coatings wherein at least one coating layer is deposited from such a coating composition.

BACKGROUND INFORMATION

Coatings are applied to appliances, automobiles, aircraft, and the like for a number of reasons, typically for corrosion protection and/or enhanced performance. To improve the corrosion resistance of a metal substrate, corrosion inhibitors are typically used in the coatings applied to the substrate. A common corrosion inhibitor is strontium chromate, which provides excellent corrosion resistance for the metal substrates, especially for aluminum substrates. However, corrosion inhibitors such as strontium chromate are highly toxic and carcinogenic, and their use results in the production of waste streams that pose environmental concerns and disposal issues.

As a result, it is desirable to provide a corrosion resistant coating substantially free of chromate pigments.

SUMMARY OF THE INVENTION

The present invention is directed to a coating comprising: (a) a first component comprising: (i) an epoxy functional resin; and (ii) a corrosion resisting particle; and (b) a second component comprising a crosslinker having a first functionality that crosslinks with the epoxy functionality of the first component and a second functionality that self-crosslinks.

DETAILED DESCRIPTION OF THE INVENTION

The present invention is directed to a multi-component coating composition comprising an epoxy functional resin and corrosion resisting particle in the first component and a crosslinker in the second component. The crosslinker has functionality that provides crosslinking via two mechanisms. First, the crosslinker comprises functionality that reacts with the epoxy functionality on the epoxy resin; the crosslinker also comprises a second functionality that can undergo self-crosslinking. In addition to the self-crosslinking, in certain embodiments the second functionality may also act as an adhesion promoter.

Any epoxy functional resin can be used according to the present invention. As used herein, an "epoxy resin" or "epoxy functional resin" is a resin having unreacted epoxy functionality. The unreacted epoxy functionality is able to react with functionality found on other compounds used in the coating. Suitable examples of epoxy resins include the diglycidyl ethers of bisphenol A, bisphenol F, glycerol, novolacs and the like, including those epoxy resins described in U.S. Pat. No. 4,681,811, column 5, line 33 to 58, the cited portion of which is incorporated by reference herein. Other suitable epoxy resins comprise urethane epoxy, epoxy functional polythioethers, and epoxy functional polysulfides. Epoxy resins are widely commercially available, such as from Momentive in their EPON and EPIKOTE lines. Mixtures of epoxy resins are also within the scope of the present invention.

Any corrosion resisting particle can be used according to the present invention. As used herein, the term "corrosion resisting particles" refers to particles that, when included in a coating composition deposited upon a substrate, act to provide a coating that resists or, in some cases, even prevents, the alteration or degradation of the substrate, such as by a chemical or electrochemical oxidizing process, including rust in iron containing substrates and degradative oxides in aluminum substrates.

In certain embodiments, the present invention is directed to coating compositions that comprise corrosion resisting particles comprising an inorganic oxide, in some embodiments a plurality of inorganic oxides, such as, for example, zinc oxide (ZnO), magnesium oxide (MgO), cerium oxide ($CeO_2$), molybdenum oxide ($MoO_3$), praseodymium oxide, and/or silicon dioxide ($SiO_2$), among others. As used herein, the term "plurality" means two or more. Therefore, certain embodiments of coating compositions of the present invention comprise corrosion resisting particles comprising two, three, four, or more than four inorganic oxides. In certain embodiments, these inorganic oxides are present in such particles, for example, in the form of a homogeneous mixture or a solid-state solution of the plurality of oxides.

In certain embodiments of the present invention, the corrosion resisting particles comprise an oxide of zinc, cerium, yttrium, manganese, magnesium, molybdenum, lithium, aluminum, magnesium, tin, or calcium. In certain embodiments, the particles comprise an oxide of magnesium, zinc, cerium, or calcium. In certain embodiments, the particles also comprise an oxide of boron, phosphorous, silicon, zirconium, iron, or titanium. In certain embodiments, the particles comprise silicon dioxide ("silica").

In certain embodiments, the corrosion resisting particles used according to the present invention comprise a plurality of inorganic oxides selected from (i) particles comprising an oxide of cerium, zinc, and silicon; (ii) particles comprising an oxide of calcium, zinc and silicon; (iii) particles comprising an oxide of phosphorous, zinc and silicon; (iv) particles comprising an oxide of yttrium, zinc, and silicon; (v) particles comprising an oxide of molybdenum, zinc, and silicon; (vi) particles comprising an oxide of boron, zinc, and silicon; (vii) particles comprising an oxide of cerium, aluminum, and silicon, (viii) particles comprising oxides of magnesium or tin and silicon, and (ix) particles comprising an oxide of cerium, boron, and silicon, or a mixture of two or more of particles (i) to (ix). MgO, alone or in combination with other inorganic oxides, is particularly suitable.

Any corrosion resisting particle, such as MgO, of any average particle size can be used according to the present invention. In certain embodiments, the corrosion resisting particle is micron sized, such as 0.5 to 50 microns or 1 to 15 microns, with size based on average particle size. In certain embodiments, the corrosion resisting particle is nano sized, such as 10 to 499 nanometers, or 10 to 100 nanometers, with size based on average particle size. It will be appreciated that these particle sizes refer to the particle size of the corrosion resisting particle at the time of incorporation into the coating. Various coating preparation methods may result in the corrosion resisting particles agglomerating, which could increase average particle size, or shearing or other action that can reduce average particle size. The corrosion resisting particle is commercially available from a number of sources, such as those listed in the Example section.

For example, certain embodiments of the coating compositions of the present invention comprise ultrafine corrosion resisting particles. As used herein, the term "ultrafine" refers to particles that have a B.E.T. specific surface area of at least 10 square meters per gram, such as 30 to 500 square meters per gram, or, in some cases, 80 to 250 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the coating compositions of the present invention comprise corrosion resisting particles, such as MgO particles, having a calculated equivalent spherical diameter of no more than 200 nanometers, such as no more than 100 nanometers, or, in certain embodiments, 5 to 50 nanometers. As will be understood by those skilled in the art, a calculated equivalent spherical diameter can be determined from the B.E.T. specific surface area according to the following equation: Diameter (nanometers)=6000/[BET (m2/g)*ρ (grams/cm3)].

Certain embodiments of the coating compositions of the present invention comprise corrosion resisting particles, such as MgO particles, having an average primary particle size of no more than 100 nanometers, such as no more than 50 nanometers, or, in certain embodiments, no more than 25 nanometers, as determined by visually examining a micrograph of a transmission electron microscopy ("TEM") image, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle as opposed to an agglomeration of two or more individual particles.

In certain embodiments, the corrosion resisting particles have an affinity for the medium of the composition sufficient to keep the particles suspended therein. In these embodiments, the affinity of the particles for the medium is greater than the affinity of the particles for each other, thereby reducing or eliminating agglomeration of the particles within the medium.

The shape (or morphology) of the corrosion resisting particles, such as the MgO particles, can vary. For example, generally spherical morphologies can be used, as well as particles that are cubic, platy, polyhedric, or acicular (elongated or fibrous). In other specific embodiments, the particles may be covered completely in a polymeric gel, not covered at all in a polymeric gel, or covered partially with a polymeric gel. "Covered partially with a polymeric gel" means that at least some portion of the particle has a polymeric gel deposited thereon, which, for example, may be covalently bonded to the particle or merely associated with the particle.

The amount of corrosion resistant particle, such as MgO, used in the present coatings can vary depending on the needs of the user. For example, the present coatings can comprise 1 to 75 weight % particles, such as 5 to 50 or 10 to 50, with weight % based on the total solids, including pigments, of the blended coating. By "blended coating" is meant the coating that is applied to a substrate; that is, the coating that results from the two components being mixed together.

In certain embodiments, the corrosion resisting particles specifically exclude praseodymium. Still other embodiments specifically exclude all rare earth elements. By rare earth is meant a collection of seventeen chemical elements in the periodic table, specifically the fifteen lanthanoids (the fifteen elements with atomic numbers 57 through 71, from lanthanum to lutetium) plus scandium and yttrium. Other specific embodiments exclude chromium or derivatives thereof, such as a chromium containing material. As used herein, the term "chromium containing material" refers to materials that include a chromium trioxide group, CrO3. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate. When a coating of the present invention is substantially free or completely free of chromium, this includes chromium in any form including chromium containing materials.

Thus, in certain embodiments, the present coatings are substantially free of one or more rare earth metals in any form, including but not limited to praseodymium oxide, and/or chromium in any form. In other embodiments, the coating compositions of the present invention are completely free of any or all of these compounds or materials. As used herein, the term "substantially free" means that the particular material or compound is present in the composition, if at all, as an incidental impurity. In other words, the amount of material is so small that it does not affect the properties of the composition; in the case of chromate or chromium, this may further include that the material is not present in the coatings in such a level that they cause a burden on the environment. This means that, in certain embodiments of the present invention, the coating composition contains less than 2 weight % of any or all of the above compounds or materials, or, in some cases, less than 0.05 weight % of any or all of the above compounds or materials, wherein such weight percents are based on the total weight of the composition. As used herein, the term "completely free" means that the material is not present in the composition at all.

The coatings of the present invention may further comprise an amino acid. When present, the amino acid may be in the first component, the second component or both. Amino acids will be understood by those skilled in the art as compounds having both acid and amine functionality, with side chains specific to each amino acid. The amino acid may be monomeric or oligomeric, including a dimer. In certain embodiments, when an oligomeric amino acid is used, the molecular weight, as determined by GPC, of the oligomer is less than 1000.

While any of the amino acids can be used according to the present invention, particularly suitable are histidine, arginine, lysine, cysteine, cystine, tryptophan, methionine, phenylalanine and tyrosine. It will be further understood that amino acids can be either L- or D-enantiomers, which are mirror images of each other, and that the L-configurations are typically found in proteins and nature and as such are widely commercially available. The term "amino acids" as used herein therefore refers to both the D- and L-configurations; in certain embodiments, only the L- or only the D-configuration may be included. Amino acids can be purchased, for example, from Sigma Aldrich, Thermo Fisher Scientific, Hawkins Pharmaceutical, or Ajinomato. Certain embodiments of the present invention specifically exclude the amino acids glycine, arginine, proline, cysteine and/or methionine.

The amino acid can be present in any amount that improves the corrosion resistance of the coating. For example, the amino acids may be present in an amount of 0.1 to 20 weight %, such as 2 to 4 weight %, with weight percent based on resin solids in the blended coating. The amount of amino acid and the amount of corrosion resisting particle may be selected together to give the optimum corrosion resistance to a coating.

As noted above, the coating composition of the present invention comprises a second component comprising a crosslinker or curing agent. The crosslinker has functionality that reacts with the epoxy functionality of the epoxy resin. Examples of such functionality include, for example, amine groups, amide groups, and thiol groups. The crosslinker also comprises functionality that will self-crosslink; that is, it will crosslink with itself. Examples of such functionality include alkoxy-silane, alkoxy-titanate, and alkoxy-zirconate. While the crosslinker has been described herein in terms of having two different types of functionality, it can have more than two types as well.

Particularly suitable crosslinkers include amino silanes. In certain embodiments, the crosslinker comprises dipodal silane. "Dipodal silane" will be understood as referring to crosslinkers that have two distinctly separate silicon atoms that contain alkoxy-silane functionality. Examples of commercially available dipodal silane include SILQUEST A1170 (bis(trimethoxysilylpropyl)amine) from Momentive, SIB 1834 (Bis[(trimethoxysilyl)propyl]-ethylenediamine) from Gelest, and SIB 1620 (Bis(methyldiethoxysilylpropyl) amine) also from Gelest.

The coating compositions of the present invention are multi-component coating compositions. While described herein as comprising a first and a second component, it will be understood that any number of additional components can also be used in the formulation of the coating. The components will be admixed prior to application.

The epoxy resin and crosslinker comprise a film-forming resin. As used herein, the term "film-forming resin" refers to resins that can form a self-supporting continuous film on at least a horizontal surface of a substrate upon removal of any diluents or carriers present in the composition or upon curing at ambient conditions or elevated temperature. The present coatings can cure under ambient conditions. By ambient conditions is meant that the coating undergoes a thermosetting reaction without the aid of heat or other energy, for example, without baking in an oven, use of forced air, or the like.

As noted above, the present compositions cure by two mechanisms. In a first mechanism, the epoxy reacting functionality, such as the amine functionality, on the crosslinker reacts with the epoxy functionality on the epoxy resin. In a second mechanism, the silane on the crosslinker self-condenses. It is possible that even further curing mechanisms may occur, depending on the other functionality in the first component or second component.

It is also possible to use one or more additional film-forming resins in the coating. Additional film-forming resins that may be used include, without limitation, those used in aerospace coating compositions, automotive OEM coating compositions, automotive refinish coating compositions, industrial coating compositions, architectural coating compositions, and coil coating compositions, among others. Film-forming resins suitable for use in the coating compositions of the present invention include, for example, resins based on acrylic, saturated or unsaturated polyester, alkyd, polyurethane or polyether, polyvinyl, cellulosic, silicon-based polymers, co-polymers thereof, which resins may contain reactive groups such as epoxy, carboxylic acid, hydroxyl, isocyanate, amide, carbamate, amine and carboxylate groups, among others, including mixtures thereof. Combinations of film-forming resins can be used. In certain embodiments, the additional film-forming resin included in the coating compositions of the present invention comprises a resin with functionality that will cure with the crosslinker described above, while in other embodiments, one or more additional crosslinkers can be used. Suitable crosslinkers can be determined by those skilled in the art based on the resins chosen.

In certain embodiments of the present invention, the epoxy resin is present in the coating compositions of the present invention in an amount greater than 10 weight %, such as 20 to 90 weight %, or, in some cases, 20 to 60 weight %, with weight percent being based on the total solid weight of the blended coating composition. The total amount of crosslinker in these embodiments may be present in an amount of up to 70 weight %, such as 10 to 70 or 10 to 40 weight %; this weight percent is also based on the total solid weight of the blended coating composition. It will be appreciated that the amino silane used according to certain embodiments of the present invention is used as a crosslinker in the film-forming resin and is not added in quantities typically used when silane is used as additive, such as to improve adhesion. In certain embodiments, the equivalent ratio of epoxy to amine is 2:1 to 1:2, such as 1.5:1 to 1:1.5 or 1.2:1.0.

According to embodiments of the present invention, the coating compositions are in the form of liquid coating compositions, examples of which include waterborne (WB) and solvent-borne (SB) coating compositions and electrodepositable coating compositions. The coating compositions of the present invention may also be in the form of a co-reactable solid in particulate form (i.e., a powder coating composition).

When water is used as the primary diluent (i.e. greater than 50%), the coating composition may be a waterborne coating composition. In other embodiments, when solvent is used as the primary diluent (i.e. greater than 50%), the coating composition may be a solvent borne coating composition. For example, in certain embodiments, the present invention may comprise solvents, such as ketone, acetate, glycol, alcohol and/or aromatic solvents. Exemplary suitable solvents are described in U.S. Pat. No. 6,774,168 at column 3, lines 28 to 41, the cited portion of which is incorporated by reference herein.

As noted above, the waterborne or solventborne coating composition is a multi-component system including a base component, e.g., the epoxy functional polymer, an activator or crosslinker component, e.g., amine functional silane, and optionally a third component, e.g. a thinner component, e.g., water or an aqueous solution. Other ingredients can optionally be contained in any of the components. The three components of the mixture may be combined shortly before application to the substrate. For example, the epoxy functional polymer base component and the amine functional silane activator component, and any other additional components, if used, may be stored separately and mixed just prior to application.

The coating compositions of the present invention can also comprise any additives standard in the art of coating manufacture including colorants, plasticizers, abrasion-resistant particles, film strengthening particles, flow control agents, thixotropic agents, rheology modifiers, catalysts, antioxidants, biocides, defoamers, surfactants, wetting agents, dispersing aids, adhesion promoters, clays, hindered amine light stabilizers, UV light absorbers and stabilizers, a stabilizing agent, fillers, organic cosolvents, reactive diluents, grind vehicles, and other customary auxiliaries, or combinations thereof. The term "colorant", as used herein is as defined in U.S. Patent Publication No. 2012/0149820, paragraphs 29 to 38, the cited portion of which is incorporated herein by reference.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

As used herein, the terms "adhesion promoter" and "adhesion promoting component" refer to any material that, when included in the composition, enhances the adhesion of the coating composition to a metal substrate. In certain embodiments of the present invention, such an adhesion promoting "component" is the crosslinker itself. This is believed to occur through formation of covalent bonds with the surface of the substrate, although the inventors do not wish to be bound by this mechanism.

In certain embodiments, the coating compositions of the present invention may also comprise, in addition to any of the previously described corrosion resisting particles, additional conventional non-chrome corrosion resisting particles. Suitable conventional non-chrome corrosion resisting particles include, but are not limited to, iron phosphate, zinc phosphate, calcium ion-exchanged silica, colloidal silica, synthetic amorphous silica, and molybdates, such as calcium molybdate, zinc molybdate, barium molybdate, strontium molybdate, and mixtures thereof. Suitable calcium ion-exchanged silica is commercially available from W. R. Grace & Co. as SHIELDEX. AC3 and/or SHIELDEX. C303. Suitable amorphous silica is available from W. R. Grace & Co. as SYLOID. Suitable zinc hydroxyl phosphate is commercially available from Elementis Specialties, Inc. as NALZIN. 2. These conventional non-chrome corrosion resisting pigments typically comprise particles having a particle size of approximately one micron or larger. In certain embodiments, these particles are present in the coating compositions of the present invention in an amount ranging from 5 to 40 percent by weight, such as 10 to 25 percent by weight, with the percents by weight being based on the total solids weight of the composition.

The present coatings may also comprise one or more organic inhibitors. Examples of such inhibitors include but are not limited to sulfur and/or nitrogen containing heterocyclic compounds, examples of which include azoles, thiophene, hydrazine and derivatives, pyrrole and derivatives. Such organic inhibitors are described in U.S. Publication No. 2013/0065985, paragraph 52, which is hereby incorporated by reference. When used, organic inhibitors may be present in the coating compositions in an amount ranging from 0.1 to 20 weight %, such as 0.5 to 10 weight %, with weight percent being based on the total solids weight of the blended composition.

The present coatings may also comprise one or more catalysts. While any appropriate catalyst can be used as determined by one skilled in the art, an amine catalyst is particularly suitable. Examples include tertiary amine catalysts such as 2,4,6-Tri(dimethylaminomethyl) phenol, commercially available as ANCAMINE KM from Air Products. Other suitable catalysts include but are not limited to imidazoles, Lewis Acids, and resorcinol.

As noted above, the coating compositions of the present invention can be liquid coating compositions, examples of which include aqueous or water-based and solvent-based coating compositions and electrodepositable coating compositions, or in the form of a co-reactable solid in particulate form, i.e., a powder coating composition. Regardless of the form, the coating compositions of the present invention may be pigmented or clear and may be used alone or in combination as primers, basecoats, or topcoats. Certain embodiments of the present invention, as discussion in more detail below, are directed to corrosion resistant primer and/or pretreatment coating compositions. As indicated, certain embodiments of the present invention are directed to metal substrate primer coating compositions, such as "wash primers," and/or metal substrate pretreatment coating compositions. As used herein, the term "primer coating composition" refers to coating compositions from which an undercoating may be deposited onto a substrate. In some industries or substrates, the primer is applied to prepare the surface for application of a protective or decorative coating system. In other industries or substrates, another coating layer is not applied on top of the primer. For example, substrate surfaces that have limited or no external exposure might have a primer with no other layer on top. As used herein, the term "wash primer" refers to primer coating compositions that include an adhesion promoting component, such as an alkoxy silane as described in more detail above. As used herein, the term "pretreatment coating composition" refers to coating compositions that can be applied at very low film thickness to a bare substrate to improve corrosion resistance or to increase adhesion of subsequently applied coating layers.

When the coating compositions of the present invention are used as a primer, in some embodiments, a protective and/or decorative coating system may be applied to at least a portion of the primer, such as a monocoat topcoat or a combination of a pigmented base coating composition and a clearcoat composition, i.e., a color-plus-clear system. As a result, the present invention is also directed to multi-component composite coatings comprising at least one coating layer deposited from a coating composition of the present invention. In certain embodiments, the multi-component composite coating compositions of the present invention comprise a base-coat film-forming composition serving as a basecoat (often a pigmented color coat) and a film-forming composition applied over the basecoat serving as a topcoat (often a transparent or clear coat).

In these embodiments of the present invention, the coating composition from which the basecoat and/or topcoat is deposited may comprise, for example, any of the conventional basecoat or topcoat coating compositions known to those skilled in the art of, for example, formulating automotive OEM coating compositions, automotive refinish coating compositions, industrial coating compositions, architectural coating compositions, coil coating compositions, and aerospace coating compositions, among others. Such compositions typically include a film-forming resin that may include, for example, an acrylic polymer, a polyester, and/or a polyurethane. Exemplary film-forming resins are disclosed in U.S. Pat. No. 4,220,679, at column 2, line 24 to column 4, line 40; as well as U.S. Pat. Nos. 4,403,003, 4,147,679 and 5,071,904 the entire contents of which are incorporated herein by reference.

Metal substrates that may be coated with such compositions include, for example, substrates comprising steel (including electrogalvanized steel, cold rolled steel, hot-dipped galvanized steel, among others), aluminum, aluminum alloys, zinc-aluminum alloys, clad aluminum, and aluminum plated steel. Substrates that may be coated with such compositions also may comprise more than one metal or metal alloy, in that the substrate may be a combination of two or more metal substrates assembled together, such as hot-dipped galvanized steel assembled with aluminum substrates. The substrate can be one that has been already treated in some manner, such as to impart visual and/or color effect, or some performance enhancement such as corrosion resistance.

Accordingly, the present invention is further directed to a substrate coated at least in part with the coating of the present invention. The substrate may comprise part of a vehicle. "Vehicle" is used herein in its broadest sense and includes all types of vehicles, such as but not limited to airplanes, helicopters, cars, trucks, buses, vans, golf carts, motorcycles, bicycles, railroad cars, tanks and the like. It will be appreciated that the portion of the vehicle that is coated according to the present invention may vary depending on why the coating is being used.

The coating compositions of the present invention, which may be, for example, metal substrate primer coating compositions and/or metal substrate pretreatment coating compositions, may be applied to bare metal. By "bare" is meant a virgin material that has not been treated with any pretreatment compositions, such as, for example, conventional phosphating baths, heavy metal rinses, etc. Additionally, bare metal substrates being coated with the coating compositions of the present invention may be a cut edge of a substrate that is otherwise treated and/or coated over the rest of its surface. In certain embodiments, the substrate may be abraded prior to application of the coating and/or pretreatment. "Abraded" means to partially wear away the surface of the substrate by mechanical action. This can be by hand or machine, using abrasive materials such as sandpaper, SCOTCHBRITE pads, or slurries of abrasive materials such as rubbing compounds or polishing compounds.

Before applying a coating composition of the present invention as a primer and/or a metal pretreatment, the metal substrate to be coated may first be cleaned to remove grease, dirt, or other extraneous matter. Conventional cleaning procedures and materials may be employed. These materials could include, for example, mild or strong alkaline cleaners, such as those that are commercially available. Examples include BASE Phase Non-Phos and BASE Phase #6, both of which are available from PPG Industries, Pretreatment and Specialty Products. Other examples include ALK-660 and ED-500, both of which are available from PPG Industries, Aerospace Coatings Products. The application of such cleaners may be followed and/or preceded by a water rinse.

The metal surface may then be rinsed with an aqueous acidic solution after cleaning with the alkaline cleaner and before contact with the present coating composition. Examples of suitable rinse solutions include mild or strong acidic cleaners, such as the dilute nitric acid solutions commercially available. Examples include AC-5, AC-12, and EAC-8, all of which are available from PPG Industries, Aerospace Coatings Products. Combination cleaning/abrading solutions can also be used.

The coating compositions of the present invention may be prepared by any of a variety of methods. For example, in certain embodiments, corrosion resisting particles can be added at any time during the formulation of a coating composition comprising an epoxy functional resin, so long as they form a stable dispersion in the epoxy functional resin. Coating compositions of the present invention can be prepared by first mixing an epoxy functional resin, a corrosion resisting particle, pigment(s), filler(s) and diluent(s), such as organic solvent(s) and/or water, dispersing the mixture with a high speed disperser at 1000 to 2000 RPM for 10 to 30 minutes, and then passing the dispersion through a paint mill to achieve grinding fineness of 5 plus, as checked with a grinding gauge.

The coating compositions of the present invention may be applied to a substrate by known application techniques, such as dipping or immersion, spraying, intermittent spraying, dipping followed by spraying, spraying followed by dipping, brushing, or by roll-coating. Usual spray techniques and equipment for air spraying and electrostatic spraying, either manual or automatic methods, can be used. While the coating compositions of the present invention can be applied to various substrates, such as wood, glass, cloth, plastic, foam, including elastomeric substrates and the like, in many cases, the substrate comprises a metal such as those discussed above.

In certain embodiments of the coating compositions of the present invention, after application of the composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 70 to 250° F. (27 to 121° C.) will be sufficient. More than one coating layer of the present composition may be applied if desired. In certain embodiments, two or more coating layers are applied "wet-on-wet", wherein at least one of the coatings comprises the coating of the present invention. Usually between coats, the previously applied coat is flashed; that is, exposed to ambient conditions for the desired amount of time. In certain embodiments, the thickness of the coating is from 0.1 to 3 mils (2.5 to 75 microns), such as 0.2 to 2.0 mils (5.0 to 50 microns). The coating composition may then be heated. In the curing operation, solvents are driven off and crosslinkable components of the composition, if any, are crosslinked. The heating and curing operation is sometimes carried out at a temperature in the range of from 70 to 250° F. (27 to 121° C.) but, if needed, lower or higher temperatures may be used. As noted previously, the coatings of the present invention may also cure without the addition of heat or a drying step, that is, at "ambient conditions". The ability to cure under ambient conditions is an advantage of the present coatings.

Coil coatings, having wide application in many industries, are also within the scope of the present invention.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "an" epoxy functional resin, "a" corrosion resisting particle, and "a" crosslinker, one or more of each of these and any other components described herein can be used. As used herein, the term "polymer" refers to oligomers and both homopolymers and copolymers, and the prefix "poly" refers to two or more. Including and like terms means including, but not limited to. When ranges are given, any endpoints of those ranges and/or numbers within those ranges can be combined with the scope of the present invention.

EXAMPLES

The following examples are intended to illustrate the invention and should not be construed as limiting the invention in any way.

TABLE 1 provides a description of materials used in preparation of the examples.

| Component | Description | Supplier |
|---|---|---|
| ANCAMINE K54 | 2,4,6-Tri(dimethylaminomethyl) phenol Catalyst | Air Products |
| EPIKOTE 1001 | Bisphenol A/epichlorohydrin resin | Momentive |
| EPIKOTE 827 | Bisphenol A/epichlorohydrin resin | Momentive |
| MAGLITE Y | MgO: <10 micron ave. particle size, 55 $m^2$/g surface area | HallStar |
| PM Acetate | DOWANOL PM Acetate | Dow Chemical |
| BORCHIGEN 911 | Dispersing Aid | OMG Borchers GmbH |
| BAYFERROX 3920 | Micronized iron oxide yellow pigment | Lanxess |
| SILQUEST A1170 | bis(trimethoxysilylpropyl) amine | Momentive |

For all examples, amounts given for each material are in grams by weight.

A coating was prepared as described below using the materials identified in Table 2.

TABLE 2

| RAW MATERIAL | WEIGHT | VOLUME | % |
|---|---|---|---|
| FIRST COMPONENT (BASE) | | | |
| PM Acetate | 29.213 | 29.81 | 20.40 |
| EPIKOTE 1001 | 14.644 | 12.31 | 10.23 |
| EPIKOTE 827 | 14.209 | 12.25 | 9.92 |
| BORCIIIGEN 911 | 3.549 | 3.66 | 2.48 |
| MAGLITE Y | 49.872 | 14.25 | 34.83 |
| BAYFERROX 3920 | 7.398 | 1.80 | 5.17 |
| n-butyl acetate | 9.663 | 10.98 | 6.75 |
| PM Acetate | 14.643 | 14.94 | 10.23 |
| BASE TOTALS | 143.190 | 100.00 | 100.00 |
| SECOND COMPONENT (ACTIVATOR) | | | |
| n-butyl acetate | 15.097 | 17.16 | 31.06 |
| ANCAMINE K-54 | 2.717 | 2.80 | 5.59 |
| SILQUEST A1170 | 30.798 | 29.61 | 63.35 |
| ACTIVATOR TOTALS | 48.612 | 49.570 | 100.00 |
| MIXED TOTALS | 191.802 | 149.57 | |

| | SG | Wt solids | Vol Solids | VOC | Dry film density | Solvent Content % | Mix ratio (by volume) | XL (E/A) | | 1.21 |
|---|---|---|---|---|---|---|---|---|---|---|
| Base | 1.432 | 61.95 | 43.055 | 544.78 | 2.060 | 38.05 | 1.00 | 2.0 | E1001/E827 | 50.75 |
| Activator | 0.981 | 34.48 | 32.892 | 642.55 | 1.028 | 65.52 | 0.50 | 1.0 | MgO PVC | 24.00 |
| Mixed Product | 1.282 | 54.99 | 39.687 | 577.18 | 1.777 | 45.01 | | | YO PVC | 3.04 |

The base component of the Coating Example was prepared by blending materials of the composition together using high speed dispersion followed by grinding on a horizontal bead mill. The final base component had a fineness of grind below 10 microns as measured by a grind gage according to ISO 1524. The activator component of the coating example was prepared by mixing together materials of the composition using moderate agitation. Both components were left standing for a minimum of one day prior to application to test pieces.

The base and activator components were mixed together in a ratio by volume of 2 units of base to 2 units of activator. The components were hand-mixed until uniform. No induction time was required prior to application of the mixed product.

Preparation of Test Panels

The mixed Coating Example was applied to clad and unclad 2024-T3 aluminium alloy panels which had been abraded using green Scotchbrite® from 3M. The preparation procedure involved solvent degreasing the panels followed by abrading using Scotchbrite soaked in an alkaline degreasing solution. The panels were then rinsed under running water and allowed to dry before wiping with solvent prior to application of the mixed Coating Example.

The mixed Coating Example was applied onto the prepared test panels using a gravity fed air atomized spray gun to achieve a final (dry film) film thickness of 10+/−2 microns.

Tests Performed

Tests performed include dry and wet adhesion according to test method ISO 2409 and filiform corrosion testing according to test method ISO 3665.

Evaluation of Results

Typical results are shown in the following table; numerical assessments are defined in ISO 2409 for wet and dry adhesion tests. Filiform corrosion ratings are recorded as the longest filament present on each panel and are measured in millimetres. Each test was run in triplicate and results for each individual test panel are separated by a dash in the table below.

| SUBSTRATE | Adhesion | Water | filiform 1000 H |
|---|---|---|---|
| CLAD | 0-0-0 | 1-1-1 | 0.8-1.1-0.8 |
| BARE | | | 1.2-1.9-1.4 |

Note that the coating of the present invention demonstrated good adhesion characteristics to the clad aluminium alloy, with 100% adhesion initially, and 95% or greater adhesion after exposure to water. Additionally, the coating of the present invention demonstrated good filiform corrosion results over both clad and bare aluminium alloys with no corrosion filaments being greater than 1.9 mm in length.

Preparation of Test Panels II

The mixed Coating Example was applied to clad and unclad 2024-T3 aluminum alloy panels that had surfaces prepared as outlined in AMS-3095A section 4.3.2. The mixed Coating Example was applied onto the prepared test panels using a gravity fed air atomized spray gun to achieve a final (dry film) film thickness of 10+/−2 microns. The test panels containing the Coating Example were allowed to dry at ambient conditions for 4 to 24 hours, and then DESOPRIME CF7065 chrome-free primer available from PPG Industries, Inc. was applied to the panels and allowed to dry according to the manufacturer's instructions. After suitable drying, DESOTHANE HS Topcoat Grey CA8800 B00707 available from PPG Industries, Inc. was applied to the panels and allowed to dry according to the manufacturer's instructions.

Tests Performed II

Testing on the multi-layered coating panels were performed according to AMS 3095A and included dry and wet adhesion, reverse impact, conical mandrel flexibility, cylindrical mandrel flexibility, fluid resistance, filiform corrosion, and salt spray corrosion.

Evaluation of Test Results II

Typical results are shown in the following table. Further descriptions of the test methods and parameters are available in AMS 3095A. All results are over 2024T3 clad unless otherwise indicated.

| Property | AMS 3095A Requirement | Result | Pass/Fail |
|---|---|---|---|
| Adhesion-Cross Hatch | Grade 0 | Grade 0 | Pass |
| Water Immersion Adhesion | Maximum Grade I | Grade 0 | Pass |
| Fluid Resistance: SKYDROL LD4 | No blistering: ≤1.5 mm defect from scribe No scratch to substrate at 1200 g load | No blistering No scribe defects No penetration | Pass |
| Filiform Corrosion | ≤3.0 mm scribe creep after 1000 hrs | 2024T3 clad: no creep 2024T3 unclad: no creep | Pass |
| Salt Spray Corrosion | ≤3.0 mm scribe creep after 3000 hrs | 2024T3 clad: 1 mm 2024T3 unclad: <1 mm | Pass |
| Reverse Impact | No cracking or adhesion loss at 92 cm-kg | No cracking or adhesion loss | Pass |
| Conical Mandrel Flexibility | No peeling, cracking, or damage | No peeling, cracking or damage | Pass |
| Cylindrical Mandrel Flexibility | No peeling, cracking, or damage using a 100 mm diameter at −55 C. | No peeling, cracking or damage | Pass |

Note that the coating of the present invention demonstrated good performance characteristics in conformance to these tests outlined in the AMS 3095A aerospace performance specification when used in a multi-layer coating system with commercially available primer and topcoat.

The invention claimed is:

1. A solvent-borne coating composition comprising:
   (a) a first component comprising:
      (i) an epoxy functional resin; and
      (ii) a corrosion resisting particle comprising MgO; and
   (b) a second component comprising a crosslinker having a first functionality that crosslinks with the epoxy functionality of the first component and a second functionality that self-crosslinks, wherein the crosslinker comprises an aminosilane present in an amount of 10 to 70 wt. % of the coating composition, where the MgO comprises 10 to 50 wt. % of the coating composition, with wt. % based on total solids, and wherein the equivalent ratio of epoxy to amine is from 2:1 to 1:2.

2. The solvent-borne coating composition of claim 1, wherein the epoxy functional resin comprises a residue of bisphenol-A.

3. The solvent-borne coating composition of claim 1, wherein the epoxy comprises urethane epoxy.

4. The solvent-borne coating composition of claim 1, wherein the solvent-borne coating composition cures at ambient conditions.

5. The solvent-borne coating composition of claim 1, wherein the MgO has a surface area of at least 10 square meters per gram.

6. The solvent-borne coating composition of claim 1, wherein the coating further comprises an amino acid.

7. The solvent-borne coating composition of claim 1, wherein the aminosilane comprises bis(trimethoxysilylpropyl)amine.

8. The solvent-borne coating composition of claim 1, wherein the second component further comprises an amine catalyst.

9. The solvent-borne coating composition of claim 8, wherein the amine catalyst comprises a tertiary amine.

10. The solvent-borne coating composition of claim 1, wherein the first functionality that reacts with the epoxy functionality of the first component is amine.

11. The solvent-borne coating composition of claim 1, wherein said coating composition is substantially free of chromium.

12. The solvent-borne coating composition of claim 1, wherein said coating composition is substantially free of praseodymium oxide.

13. The solvent-borne coating composition of claim 1, wherein the coating is substantially free of a rare earth element.

14. A method of coating a substrate comprising applying to at least a portion of the substrate the solvent-borne coating composition of claim 1.

15. A substrate coated according to claim 14.

16. The substrate of claim 15, wherein the substrate comprises aluminum.

17. The substrate of claim 15, wherein the substrate comprises steel.

18. The solvent-borne coating composition of claim 1, wherein the epoxy functional resin is present in an amount of 20 to 90 wt. %, with wt. % based on total solids.

* * * * *